United States Patent [19]

Tar

[11] 4,415,806
[45] Nov. 15, 1983

[54] RADIATION DETECTOR FOR A FLAME ALARM

[75] Inventor: Domokis Tar, Stäfa, Switzerland

[73] Assignee: Cerberus AG, Männedorf, Switzerland

[21] Appl. No.: 249,111

[22] Filed: Mar. 30, 1981

Related U.S. Application Data

[62] Division of Ser. No. 31,431, Apr. 19, 1979, Pat. No. 4,280,058.

[30] Foreign Application Priority Data

Apr. 25, 1978 [CH] Switzerland ............... 466/78

[51] Int. Cl.³ .............................................. G01J 1/00
[52] U.S. Cl. .................................................. 250/339
[58] Field of Search .............. 250/339, 342; 340/578; 350/1.6

[56] References Cited

U.S. PATENT DOCUMENTS

| | | | |
|---|---|---|---|
| 3,665,440 | 5/1972 | McMenamin | 340/578 |
| 3,931,521 | 1/1976 | Cinzori | 250/339 |
| 4,200,360 | 4/1980 | Mutzhas | 350/1.6 |
| 4,245,217 | 1/1981 | Steinhage | 350/1.6 |

Primary Examiner—Davis L. Willis
Attorney, Agent, or Firm—Werner W. Kleeman

[57] ABSTRACT

A radiation detector containing as the radiation sensor a pyroelectrical element, for instance, lithium-tantalate or lead-zircanate-titanante. Arranged forwardly of the sensor element is a filter combination composed of a quartz filter element having a vapor-deposited narrow band filter layer with a throughpass maxima at about 4.3 μm and a germanium filter element. This filter combination displays a sharp throughpass maxima at the resonance radiation of carbon dioxide at 4.3 μm, whereas all other wavelength ranges greater by the factor 100 or 1000, respectively, are damped. A flame detector equipped with such radiation detector responds extremely selectively to flame radiation, however does not respond to spurious radiation, such as solar radiation or daylight, artificial light sources and welding sparks, even if such have more than a thousand-fold intensity, so that flames of the slightest intensity will be detected positively, sensitively, and free of disturbance even in the presence of pronounced spurious radiation.

10 Claims, 21 Drawing Figures

Fig. 1
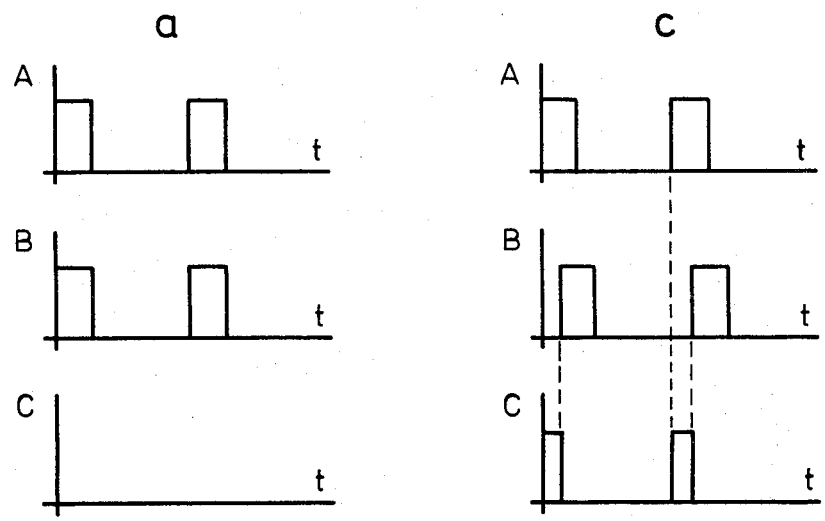
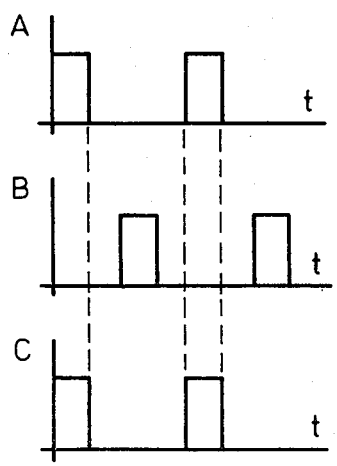
Fig. 13
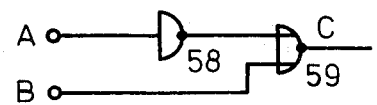

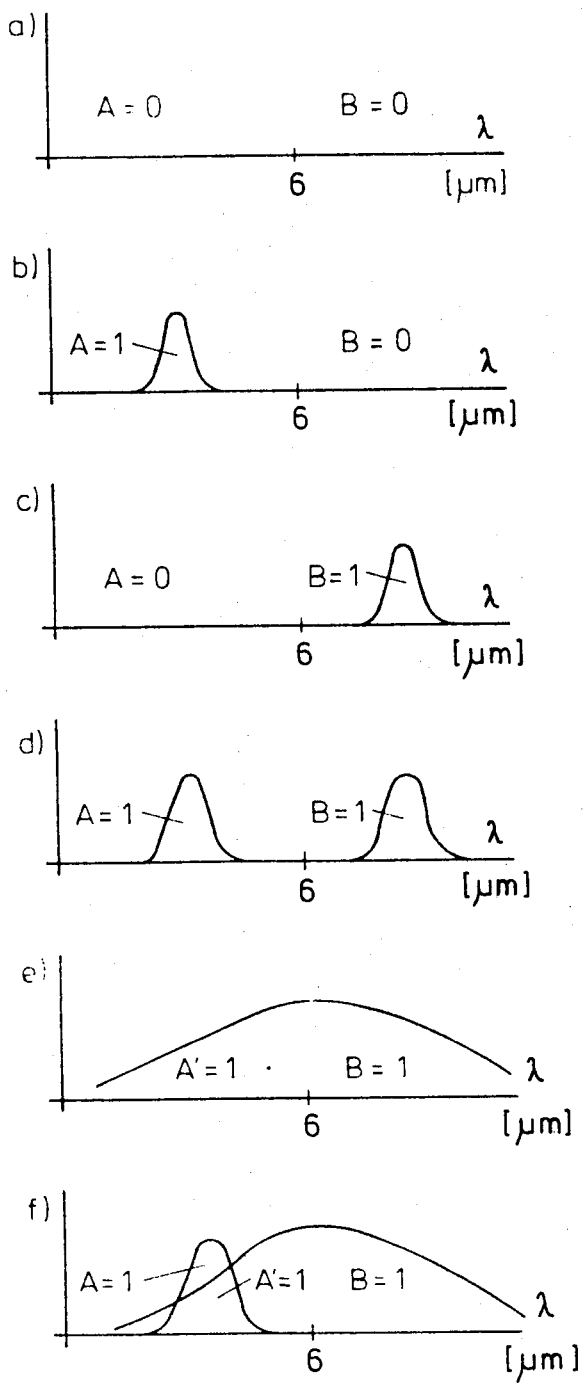

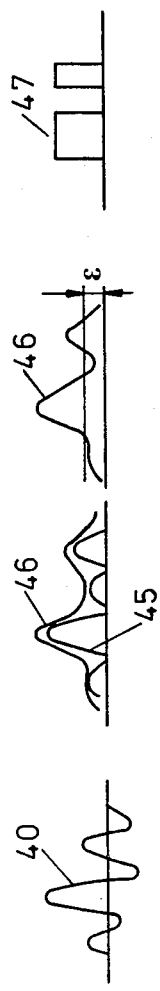
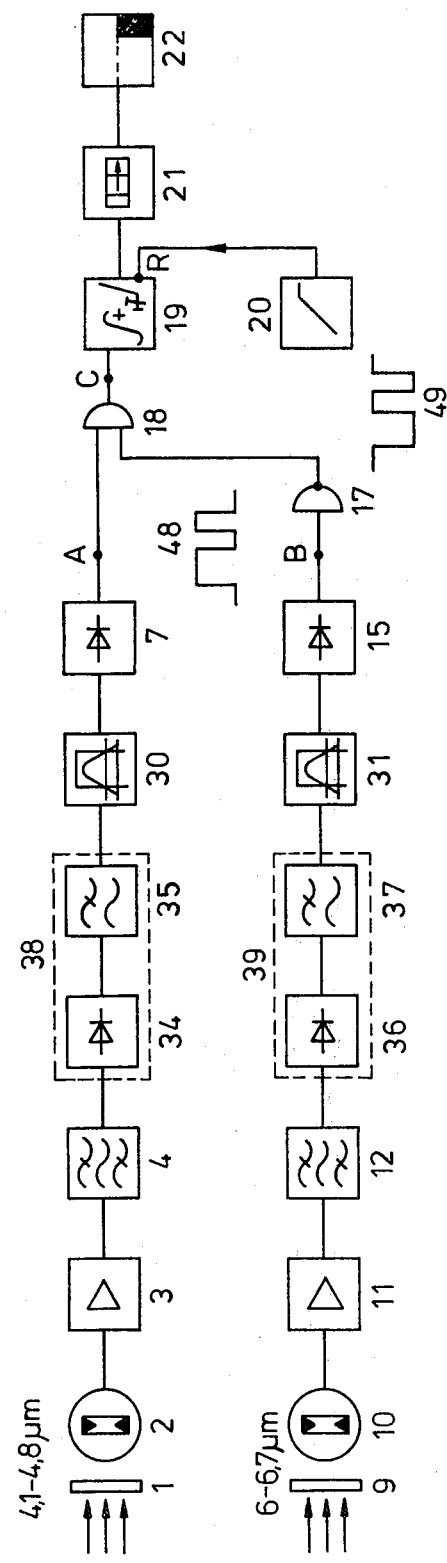
Fig. 11

RADIATION DETECTOR FOR A FLAME ALARM

CROSS REFERENCE TO RELATED APPLICATION

This application is a divisional application of my commonly assigned, copending United States application Ser. No. 31,431, filed Apr. 19, 1979 now U.S. Pat. No. 4,280,058.

BACKGROUND OF THE INVENTION

The present invention relates to a flame detector type of fire alarm with a first circuit which by photoelectric means and a band-pass filter receives the emission of a flame at least in the wavelength range of carbon dioxide and the wavelength range of the flickering of the flame and produces useful signals therefrom for an alarm means. The invention also relates to a radiation detector for a flame alarm containing a sensor element and a filter arranged forwardly thereof.

It is generally known that most flammable substances such as wood, petroleum, oil and hydrocarbons or carbohydrates—in short, organic materials—emit strongly in the wavelength ranges of approximately $\lambda = 2.7$ $\mu$m and particularly at approximately $\lambda = 4.4$ $\mu$m when they undergo combustion. Radiation emission takes place in line spectra and band spectra, the wavelength range 2.7 $\mu$m being characteristic for both water and carbon dioxide and 4.3 $\mu$m being a characteristic of only carbon dioxide. The article entitled "Fire Detection using Infrared Resonance Radiation", pages 55 to 60, FIG. 6 which appeared in the journal "Report of Fire Research Institute of Japan", Ser. No. 30 of December 1969 describes the circuit of an alarm which is sensitive to flame emission and temperature. This alarm is designed for the infrared range. However, it is not foolproof against false alarms. If spurious infrared radiation is present, e.g. radiators or ovens, whose thermal radiation is periodically interrupted by an intervening fan or the like in a particular rhythm, an undesired alarm signal can result although there is no fire or flame.

Flame alarms are subjected in practise to the most different types of spurious radiation, which can trigger a false alarm. From Swiss Pat. Nos. 509,633, 519,651, 536,066 and 558,577 there are known to the art flame alarms which make use of the different properties of flames, in order to differentiate a flame from spurious radiation, such as daylight, solar radiation or artificial light sources. For instance, there is employed the different flame properties, such as the irregular flickering and the resultant irregular intensity fluctuations of the flame radiation, or the special colour temperature or spectral composition of the flame radiation. Since certain spurious radiation however can contain radiation constituents with similar properties and such spurious radiation in practise frequently is more intense by several orders of magnitude than the flame radiation to be detected, such flame alarms therefore are not completely foolproof against false alarms and can not be set to the highest maximum sensitivity.

From French Pat. No. 2,151,148 and the mentioned article of K. Nakajima, appearing in the "Report of Fire Research Institute of Japan", it is known that the radiation of a flame predominantly consists of a narrow band intensity peak in the spectral range of the resonance of carbon dioxide at about 4.3-4.4 $\mu$m, apart from an appreciably weaker wideband spectral region in the range of visible radiation and the near infrared. The carbon dioxide-resonance radiation occurs practically at flames which occur when there is combusted organic materials, however never occur or only with decreasing intensity in the case of spurious radiation. A flame alarm which evaluates, among other criterion, essentially the resonance radiation of carbon dioxide, therefore is appreciably more secure against the giving of false alarms and less prone to disturbance than flame alarms which evaluate ultraviolet radiation, visible light or near infrared.

However, what is disadvantageous with such flame alarms which evaluate the carbon dioxide-resonance radiation is that the therein employed radiation detectors are too wideband and passed other radiation parts or components. Conventional interference filters for 4.3 $\mu$m possess, for instance, sidebands which are located in the near infrared or in the visible region, so that spurious radiation in such spectral range was likewise detected. Nakajima therefore used a filter which was specially developed by the United States firm, Optical Coating Laboratory. This special filter encompassed the carbon dioxide-resonance radiation, however for practical applications was still too wideband (3.9–5.2 $\mu$m). In order to eliminate neighboring spurious radiation it is therefore necessary to use a special lead selenide photoelement developed by Santa Barbara Research Center which is capable of eliminating radiation having a wavelength greater than 4.3 $\mu$m. What is here disadvantageous is that at standard or normal temperatures the carbon dioxide-resonance radiation already is located at the edge of the sensitivity descent, so that the flame radiation can not be fully utilized and the sensitivity of the flame alarm does not attain the optimum possible value.

SUMMARY OF THE INVENTION

A primary object of the present invention is to substantially reduce the false alarm rate of a fire alarm so that, despite the occurrence of interference sources, the alarm clearly recognises each flame or fire as such and gives the necessary alarm signal.

A further significant object of the invention is to provide an improved construction of radiation detector which positively and reliably detects flame radiation while not responding to spurious radiation.

A further important object is to overcome the aforementioned drawbacks of the state-of-the-art and, in particular, to provide a flame alarm which is less prone to disturbances, gives fewer false alarms and possesses greater sensitivity.

The invention is directed to a number of desired characteristics for evaluating emissions in the wavelength range of approximately $\lambda = 4.4$ $\mu$m for alarm-giving purposes. Normal window or lamp glass does not transmit the emission in this wavelength range. This ensures that solar radiation and normal electric light in rooms containing the alarm do not influence the giving of the alarm. Even when the fire alarm according to the invention is located in the open air, i.e. outside rooms, because there is a so-called energy gap at $\lambda = 4.3$ $\mu$m in the emission spectrum of sunlight, the sun is still not a serious interference source.

Another object of the invention is to eliminate the influence of parts of the wavelength range $\lambda > 6$ $\mu$m on the producing of an alarm, thereby eliminating the effects of heaters and ovens. Furthermore the fire alarm is to be constructed in such a way that no false alarm is produced by spurious radiation from a hot body below $\lambda = 6$ μm.

An alarm is to be triggered only when there is present a flame which in addition to the flicker frequency emits in the wavelength range $\lambda = 4.4$ μm. This alarm is also to be given if a hot body emits its spurious radiation in the wavelength range $\lambda$ 6 μm or if the spurious radiation of the hot body is modulated only with approximately the flame flicker frequency, since a complete correspondence is very unlikely.

According to the invention the desired evaluating characteristics for eliminating spurious radiation produced by a thermal radiator are obtained by means of a second circuit, in addition to the first circuit as described above for the prior devices, with an interconnecting member between the circuits. The second circuit includes the following components:

a first circuit having a filter with a given wavelength transmission range and a photoelectric means which receives radiation above the resonance wavelength range of carbon dioxide and produces an interfering signal;

a second circuit having a band-pass filter with the same flicker frequency transmission range of the spurious radiation as the range for the flame flicker frequency in the first circuit; and a connecting means which interconnects the first and second circuits and is so constructed that, while taking account the statistical distribution of the flame emission and spurious radiation, an output signal is produced in such a way that the further transmission of the signal of the first circuit is blocked if a unidirectional output signal of the second circuit occurs at the same time, while its passage to the alarm means is permitted if the output signal of the second circuit is absent or is not unidirectional.

As to the radiation detector itself for the flame alarm there is provided a filter which possesses a quartz filter element and a germanium filter element. Additionally, there can be provided a spectral band filter for wavelengths of 4.0–4.8 μm, or a narrow band filter for the carbon dioxide-resonance radiation at 4.3–4.4 μm which can be formed of interference filter layers. As the sensor element there then can be used a pyroelectrical element which ensures for an optimum sensitivity.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 1a, b, and c are graphs showing the operation provided by the comparator circuit shown in the preferred embodiments of the invention appearing in FIGS. 9, 10 and 11 between outputs of the first and second circuits thereof;

FIG. 7 shows in a series of graphs (a) to (f) various operation modes of the fire alarm according to a preferred embodiment of the invention;

FIG. 11 is a schematic circuit diagram in block form of a third embodiment of the fire alarm circuit according to the invention;

FIG. 13 is a schematic circuit diagram of another embodiment of the connecting means of FIGS. 9, 10 and 11.

DESCRIPTION OF THE PREFERRED EMBODIMENTS

Describing now the drawings, FIGS. 1a, 1b and 1c show pulses A, B and C plotted on time axis t. These pulses are taken to appear at the connecting points A, B, C of the preferred embodiment of alarm circuits of FIGS. 9, 10 and 11. FIG. 1a shows the case where in the first circuit which receives the flicker of a flame or a spurious radiation a pulse is produced and appears at connecting point A of the embodiments of FIGS. 9, 10 and 11. According to FIG. 1a, it is assumed that a spurious signal is received in the second circuit at the same time and that a square pulse is present at point B. The connecting means, which will be described in greater detail hereinafter in conjunction with the embodiments of FIGS. 9, 10, 11, 12 and 13, is constructed in such a way that in this case no output signal is produced. This is represented in FIG. 1a by C=0.

FIG. 1b shows the case in which a flame signal is produced in the first circuit and a corresponding pulse is present at connecting point A. It is assumed that in the second circuit no spurious signal is simultaneously received and that there appear at the connecting point B of the second circuit spurious pulses which do not coincide from the time standpoint with the useful pulses at point A. A signal appears at output point C of the connecting means of the embodiments of FIGS. 9, 10 and 11 only when a useful signal is present at point A of the first circuit.

FIG. 1c shows at point A of the first circuit the presence of a useful signal due to a flame and in the second circuit (connecting point B) the time-delayed presence of a spurious signal. The connecting means of FIGS. 9, 10 and 11 produces an output signal only if simultaneously a useful pulse is present at connecting point A and no spurious pulse is present at connecting point B.

FIG. 1c shows that in the case of a certain time overlap of these two pulses, the output pulse disappears at the connecting point C of the connecting means.

Figure 2:
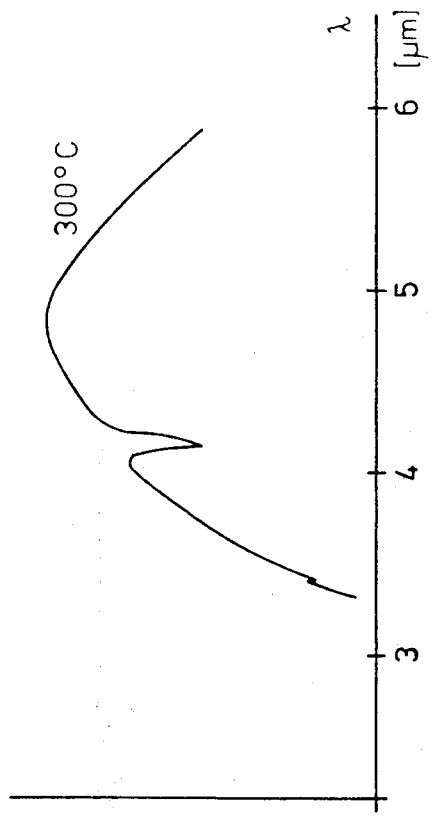
FIG. 2 is a graph showing the intensity distribution of radiation over the wavelength range of a flame.

FIG. 2 shows the intensity distribution of a typical flame spectrum. The wavelength range λ in the unit μm (micrometer) is shown on the absicssa, while the intensity in the particular wavelength range is shown on the ordinate. FIG. 2 shows clearly a pronounced intensity in the wavelength range λ=4.4 μm, which is the range for carbon dioxide. The intensity distribution has two marked maxima at 2.8 and 4.4 μm. At λ>6 μm the flame intensity can be ignored.

Figure 3:
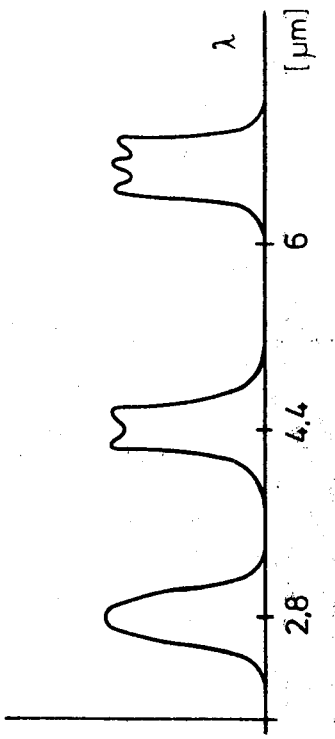
FIG. 3 is a graph showing a typical spectral intensity distribution of radiation over the wavelength range of a hot body.

FIG. 3 shows the intensity distribution of a hot body at approximately 300° C. The wavelength in μm is plotted on the abscissa and the intensity of the emission of such an interfering radiation source is plotted on the ordinate. This radiation source corresponds to a thermal radiator, e.g. heating coils or hot plates. It is assumed that the radiation is e.g. periodically interrupted by a fan. These periodic interruptions, which can be in the frequency range 4 to 15 Hz will be explained hereinafter in conjunction with the embodiments of FIGS. 9, 10, 11 and 12. Another interference source of the same type can be provided by the exhaust pipe of an internal combustion engine which, as is known, is only loosely mounted and effects movements which are approximately in the frequency range 4 to 15 Hz.

As will be described hereinafter relative to FIGS. 9, 10, 11 and 12, this frequency is in the range of the flickering flame. The types of interference or spurious sources described thus far are designated by $S_1$, as will be described in greater detail hereinafter relative to FIGS. 7a to 7f and the associated table. Another type of interference source can be a radiator or oven, which has a much lower radiation temperature than type $S_1$ of FIG. 3. The radiator, oven or heating body type of spurious radiation interference source is designated by $S_2$ and radiates in the wavelength range above 5.5 μm. In the case of interference source type $S_2$, the radiation is assumed to be interrupted at a frequency in the range 4 to 15 Hz. Such an interruption can be brought about e.g. by ventilators or by the vibration of objects positioned in front of the interference sources. For reasons of completeness, it is pointed out that the spurious radiation of the embodiments of FIGS. 9 to 12 has an interfering action only if it is interrupted. This will be described in greater detail relative to these embodiments.

The interference source type $S_1/S_2$ will be described in greater detail in the table described hereinafter relative to FIGS. 7 and 8.

Figure 4:
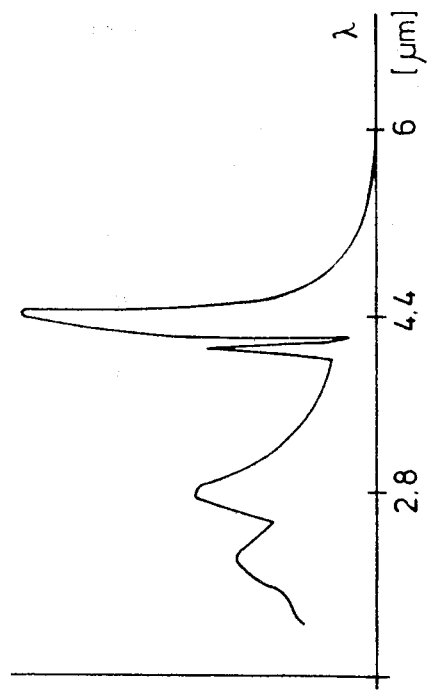
FIG. 4 is a graph of the transmission ranges of filters 1 and 9 of both circuits of a preferred embodiment of the invention.

FIG. 4 graphically shows the transmission ranges of filters 1 and 9 of the two circuits of the preferred embodiments of FIGS. 9, 10, 11 and 12. According to FIG. 4, the first circuit, which responds to the emission of flames, is provided with a filter 1 having a wavelength transmission range of about 4.4 μm. Filter 9, which is arranged in front of the second circuit of the embodiments, has a wavelength transmission range which is greater than 6 μm. In FIG. 4, the filter 9, which permits the passage of the spurious radiation, has a transmission range with an edge which rises steeply at approximately 6 μm and a front which gradually falls in the larger wavelength range.

Figure 5:
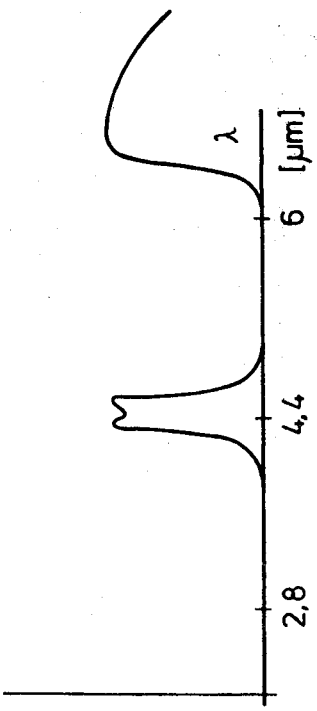
FIG. 5 is a graph of the signal transmission ranges of two useful signal circuits and one interfering signal circuit.

FIG. 5 graphically shows the transmission ranges of two useful signals in circuits of the first type and one spurious signal in a circuit of the second type. A first circuit has a filter 1 with a wavelength transmission range of approximately 2.8 μm. Another first circuit has a filter 1 with the wavelength transmission range of about 4.4 μm. A second circuit has a filter 9 with a wavelength transmission range above 6 μm. At this point it is pointed out that there can be provided three circuits to correspond to the transmission of FIG. 5. Clearly even more circuits can also be provided. The embodiments of FIGS. 9 to 12 are discussed relative to only two circuits. Filter 9 of the second circuit has, according to FIG. 5, a transmission range with steep edges on either side.

Figure 6:
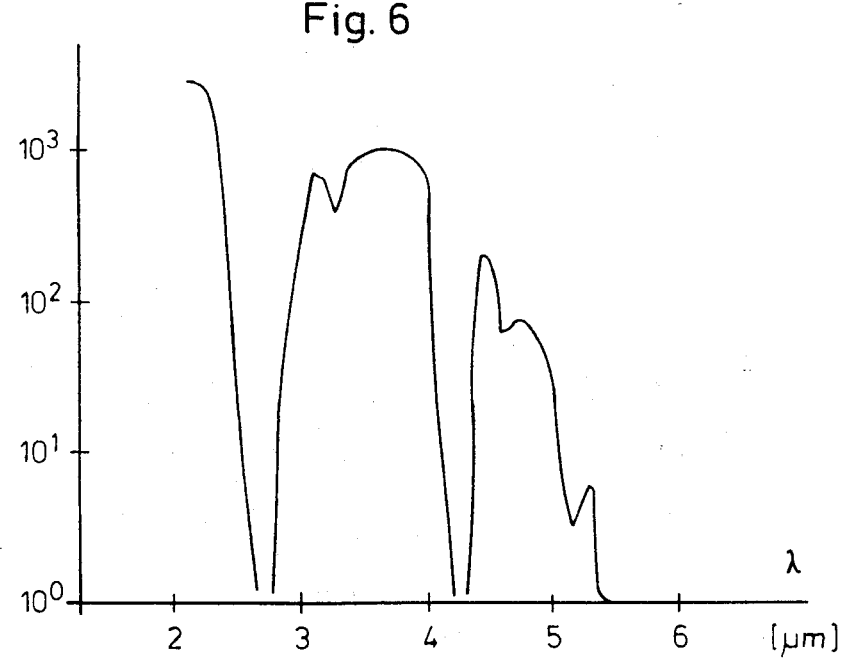
FIG. 6 is a graph of the characteristic intensity distribution of solar radiation over its emission wavelength.

FIG. 6 graphically shows the characteristic intensity distribution of normal solar radiation. The wavelength λ is plotted in μm on the abscissa and the intensity is plotted in relative units on the ordinate. The graph of FIG. 6 shows that sunlight has maxima at certain characteristic points and minima at other points. Particular reference is made to the intensity minimum at approximately 4.3 μm.

Figure 8:
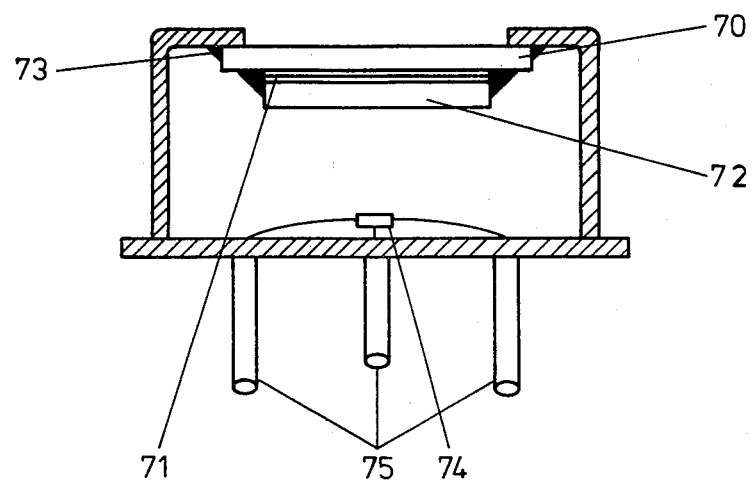
FIG. 8 is a partially sectional front view of a filter and photoelectric means of the alarm according to a preferred embodiment.

FIG. 7 shows graphically the operation of the embodiments of FIGS. 9 to 12 in conjunction with the individual parts of FIGS. 8 and 13. In FIGS. 7a, b, c, d, e, f the wavelengths λ are plotted in μm on the abscissa and the intensities of the transmission ranges of filters 1 and 9 are plotted in relative units on the ordinate.

FIG. 7a shows that there is no flame and no interference. Therefore there is no pulse or voltage at points A and B in FIGS. 9, 10, 11 and 12, which means that no alarm is produced.

FIG. 7b indicates the presence of a flame in the wavelength range of FIGS. 4 and 5. In this case there is no interference, which means that there is a pulse or a voltage at point A of the first circuit of the embodiment of FIGS. 9 to 12. There is no voltage at point B of the second circuit, and in this case an alarm is given.

FIG. 7c shows the case when interference, for example in the wavelength range of FIGS. 4 or 5, is present without a flame. A type $S_2$ interference source is assumed which, as indicated above, can be a radiator, thermal radiator or oven with a temperature of about 100° C. According to the case represented in FIG. 7c, there is no voltage at point A and there is a voltage or a pulse at point B of the circuits of FIGS. 9 to 12. In this case no alarm is given.

FIG. 7d shows the case where both a flame and spurious radiation of an $S_2$ interference source are present. The wavelength ranges are selected according to FIGS. 4 or 5. In this case, there is a voltage or pulse at points A and B of the circuits of FIGS. 9 to 12. If the voltage and pulse occur at these points A and B at the same time, no output signal occurs at point C via the connecting means 18, 26, 59 with inverters 17, 25, 58. Since, however, the flame and interference radiation flickers in a wide frequency range of 4 to 15 Hz, there is a statistical distribution in such a way that flame and interference radiation only occur synchronously here and there at points A and B (FIG. 7d) or non-synchronously (FIG. 7b or 7c). Between these situations, so-called intermediate situations occur where the voltages or pulses can partly overlap at points A and B. In this case, shown in FIG. 1c, a definite alarm signal is given at point C, which ensures that a flame still leads to an alarm signal even when spurious radiation is also present.

FIG. 7e shows the case where spurious radiation of type $S_1$ radiates over a very wide wavelength range. Such a spurious radiation source, which can be a thermal radiator (heating coils or hot plates) with a radiation temperature of about 300° C. (FIG. 3), influences not only the circuit for receiving the spurious emissions (filter 9), but also the circuit for receiving the flame of the embodiments of FIGS. 9 to 12. This means that there are synchronous voltages or pulses at points A and B, as shown in FIG. 1a. As a result of this synchronization between the useful voltage and the spurious voltage, no alarm signal is produced at output point C of connecting means 18, 26, 59. This is also correct, because there is no flame. To provide a better illustration of this, in FIG. 7e that part of the spurious emission which passes via the first circuit (useful signals) to the connecting means is designated by A'.

Another case is provided in FIG. 7f, where simultaneously a flame and a type $S_1$ spurious radiation source are present. The component emanating from the spurious emission and transmitted to the first circuit is designated by A'. The spurious emission component which passes via the second circuit is designated by B. As both components emanate from the same interference source, they are also synchronous, i.e. voltages and pulses simultaneously occur at points A and B, so that spurious emission components A' and B can not produce an alarm signal at the output C of the connecting member of FIGS. 9 to 12. This is the case shown in FIG. 7e. The flame of FIG. 7f produces at point A of the embodiments of FIGS. 9 to 12 a voltage or a pulse, which can occur either simultaneously or not simultaneously with the spurious emission A' and B. Connecting means 18 produces an alarm signal at output C if a voltage or pulse corresponding to the flame is present at point A and at the same time no voltage signal of the spurious emission is present at point B. After a certain time delay, an alarm is given.

The following table serves to better illustrate the case of FIGS. 7a to 7f. The figures given in the table under the heading "Observations" have the following meanings:
(1) No alarm signal, because no flame.
(2) Alarm pulse, because flame exists.
(3) Monitoring state.
(4) Without interference.
(5) With interference.
(6) Timing of A' and B coincides, giving C=0; A:-=A+A'
(7) Timing of A and B does not coincide, giving C=1; A:=A+A'.

These different layers 70, 71 and 72 are plane parallel, the thickness of the germanium layer 70 being approximately 1 mm, that of the interference filter 71 approximately 1 to 50 μm, and that of quartz layer 72 approximately 0.5 mm. The diameter of these layers or the filter, respectively, is approximately 8 to 12 mm. Interference filter 71 can comprise a plurality of layers, each layer being formed from a metallic or dielectric material. The filter comprising layers 70, 71 and 72 is placed in a so-called "T0-5" casing, which is the trademark of this particular casing which is readily available commercially. The not particularly referenced casing is connected to the filter by means of an adhesive 73. The sensitive element 74, optionally provided with a field-effect transistor, is placed in the casing. This sensor or sensitive element 74 converts the optical rays into electrical signals. These signals pass via lines 75 to the circuits of FIGS. 9 to 12 for instance. The sensor element 74 can be a pyroelectric detector, such as e.g. lithium-tantalate of lead-zirconate-titanate; an NTC thermistor; a photoconductor; or a thermopile. The filter or the photoelectric means of FIG. 8 is for instance provided for the first circuit in the embodiments of FIGS. 9 to 12. The filter 9 for the second circuit of the same embodiment is constructed somewhat differently. There is no quartz layer 72, whereas the spatial dimensions are the same as described hereinbefore. Furthermore, the sensitive or sensor element 74 is constructed according to whether it is used in the first or the second circuit. For example, a pyroelectric detector can be used for both circuits. Furthermore, an NTC thermistor, photoconductor, and a thermopile can also be used for both circuits. If the sensor element 74 is constructed as a photovoltaic cell or as a UV-sensitive gas-filled tube, then photoelectric means 2 can only be used in the first circuit. In this case, it is even possible to eliminate the filter comprising layers 70, 71 and 72.

The advantage of this arrangement in a flame alarm is that the quartz filter element 72 practically does not pass radiation above 4.5 μm wavelength. The germanium filter element 70 possesses, on the other hand, a sharp lower edge, somewhat below 1.5 μm. For shorter wavelengths, especially for visible light, this germanium layer or filter element 70 is practically impassible. The interference filter or layer 71 preferably only passes radiation in the spectral range of 4.3–4.4 μm.

TABLE

| Assumption | | | | | | | Result | |
|---|---|---|---|---|---|---|---|---|
| To Fig. 7 | Flame Yes/No | A | Interference Yes/No | B | A' | Interference Type | C | Observations |
| a | No | 0 | No | 0 | — | — | 0 | (1) (3) (4) |
| b | Yes | 1 | No | 0 | — | — | 1 | (2) (4) |
| c | No | 0 | Yes | 1 | 0 | $S_2$ | 0 | (1) (3) (5) |
| d | Yes | 1 | Yes | 1 | 0 | $S_2$ | 1 | (2) (5) |
| e | No | 0 | Yes | 1 | 1 | $S_1$ | 0 | (1) (3) (5) (6) |
| f | Yes | 1 | Yes | 1 | 1 | $S_1$ | 0;1 | (2) (5) (6) (7) |

FIG. 8 shows a radiation detector having at its front side a filter combination. The constructional embodiment of the filter, includes photoelectric means, and is of a type as may be used in the embodiments of FIGS. 9 to 12 by way of example. According to FIG. 8 the filter which may correspond to filter 12 of the first circuit comprises a combination of a number of filter elements, for instance a germanium or silicon layer 70, a narrow band filter, for instance an interference filter 71 for 4.3 μm, and a quartz layer 72.

With this filter combination there is obtained the result that the throughpass range is limited to the direct region of the carbon dioxide-resonance line at 4.3 μm. Longer wavelength radiation above 4.5 μm is practically completely eliminated by the quartz filter element 72, whereas radiation with a wavelength below 1.5 μm is practically completely blocked by the germanium filter or filter element 70. In the wavelength range between 1.5 μm and 4.2 μm the permeability is smaller than 1% of the maximum value at 4.3 μm to 4.4 μm.

The describer filter combination therefore possesses in the near infrared a spurious radiation suppression capability which is greater by a factor of more than 100; in the range of visible light and in the far infrared above the resonance wavelength of carbon dioxide a suppression capability which is greater by more than a factor of 1000. Spurious radiation, such as sunlight and daylight, as well as artificial light sources like glow lamps, fluorescent lamps and other spurious radiation sources, such as welding sparks and so forth, which do not possess any sharp intensity maxima at the resonance wavelength of carbon dioxide, thus are almost completely maintained away from the sensor element 74 by the described construction of filter, even if the intensity is appreciably greater, for instance more than 1000-fold that of the flame radiation. Thus, it is possible to detect with exceptional reliability already the formation of flames in their incipient stage, even in the presence of light and other spurious radiation and to differentiate the same from other radiation. When using the described filter combination it is thus possible to use a particularly sensitive sensor element, such as the described pyrotechnic element, without there arising any loss in sensitivity.

The pyroelectrical element 74 is connected by the line or connection means 75 with the evaluation circuit, which in the presence of and the detection of flame radiation delivers an appropriate signal, as explained herein.

Figure 9:
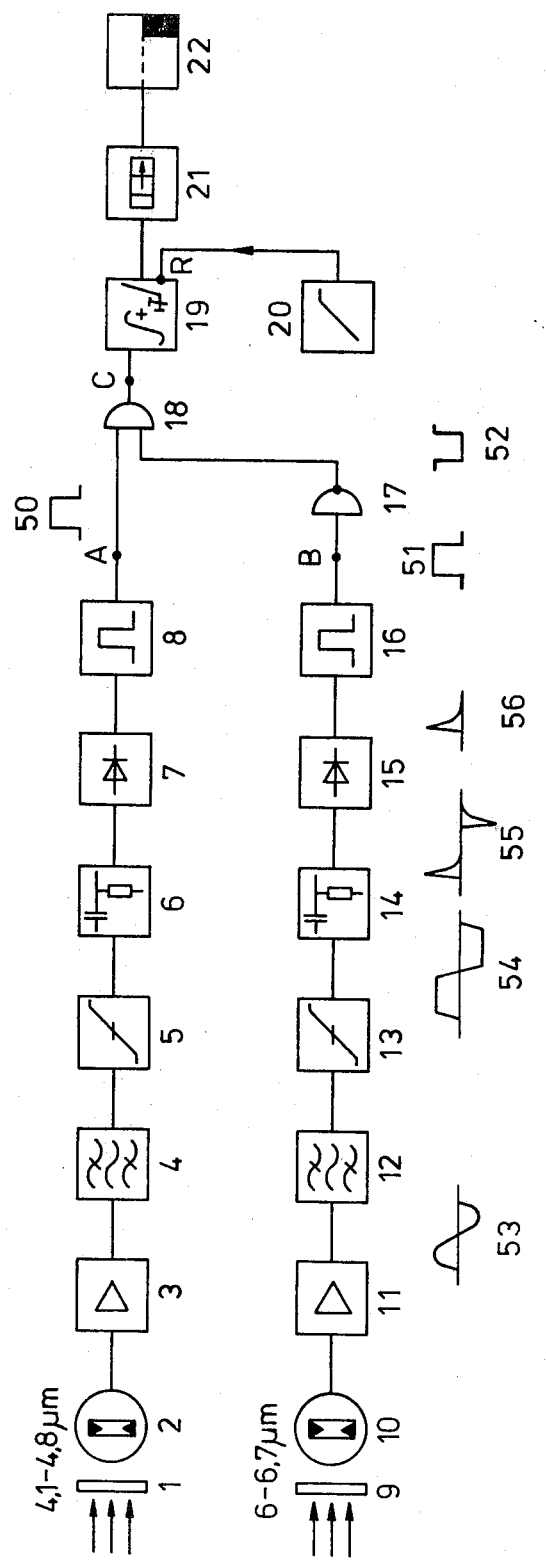
FIG. 9 is a schematic circuit diagram in block form of a first embodiment of the entire electric circuit for the fire alarm according to the invention in partial digital form accompanied by graphical representations of the signals therein.

FIG. 9 shows a first preferred embodiment of an alarm in accordance with the invention. It comprises two circuits. The first circuit is equipped with a filter 1 and a photoelectric means 2 which transmits the wavelength range of $\lambda = 4.1$ to 4.8 $\mu$m. This wavelength range is such that a flame emission passes through filter 1 to the photoelectric means (sensitive element 74 of FIG. 8) and then releases corresponding useful electrical signals, which are amplified in the following amplifier 3. These amplified signals are designated as 53 at the bottom of FIG. 9. The following band-pass filter 4 has a transmission range for the flame flicker frequency, which is between 4 and 15 Hz. This is followed by an amplitude limiter 5 which clips the amplitudes of the amplified signal 53 and produces trapezoidal signals 54. The latter pass to a differentiating element 6 which produces a voltage pulse 55 for each rising edge of signals 54. These pulses are rectified in the following rectifier 7 in such a way that only the differentiated voltage pulses 56 of one polarity reach the following monostable multi-vibrator 8, which produces pulses 50 of constant amplitude and width. In this manner the amplitude and width are made independent of the intensity of the flame. The second circuit, whose filter 9 has a wavelength transmission range of $\lambda = 6$ to 6.7 $\mu$m, is constructed in the same way as the first circuit described above. Amplifier 11 amplifies the electrical signals of photoelectric means 10. The band-pass filter 12 has a transmission range for the flicker frequency of the interference source which is also in the range 4-15 Hz. The amplitude limiter 13, differentiating element 14, rectifier 15 and monostable multi-vibrator 16 function in the same way as described in conjunction with the first circuit. Monostable multi-vibrator 16 produces pulses 51 of constant amplitude and width. The amplitude and width of these pulses are not dependent on the intensity of the spurious emission. It is now assumed that only a flame emission is present in FIG. 9, in which case the first circuit produces the pulses 50 at point A.

The second circuit produces no pulse at point B (state = 0). The following inverter circuit 17 therefore produces the state 1, which reaches the connecting means. This is constructed as an AND-gate, so that the latter produces a pulse at its output C. This pulse is transmitted to the following integrator 19, which by means of timing element 20 is reset after a given time of e.g. 5 to 15 seconds. When the AND-gate 18 is constructed digitally, the integrator 19 contains a circuit which counts the output pulses having a given minimum width. Only when a number of output pulses have entered the counter and when a given threshold value previously set in the counter is exceeded, does integrator 19 give an alarm pulse to the following circuit parts. The alarm pulse can only be produced by the integrator if the threshold value of the counter is exceeded prior to the resetting by the time switch 20. A delay element 21 is provided to ensure that an alarm signal is not given too quickly, e.g. within two seconds. The delay element 21 delays by a few seconds the further transmission of the alarm signal and passes it to the alarm exchange 22 only if the alarm signal from integrator 19 persists during this period. By means of FIG. 9, the situation shown in FIG. 7b has been discussed. The situation of FIG. 7f will now be briefly described. Since a flame is present, monostable multi-vibrator 8 produces pulses 50 at point A. Due to the presence of a type $S_1$ interference source, the monostable multi-vibrator 16 also produces at point B pulses 51. Furthermore, the type $S_1$ interference source has such a large emission range that the spurious emission influences the first circuit, and monostable multi-vibrator 8 produces another kind of pulses 50 at point A. The pulses 50 emanating from interference emission (see component A' of FIG. 7f) are still at point B, synchronously with pulses 51. Due to inverter 17, AND-gate 18 is blocked when the synchronous pulses 50, 51 are present. Since the flicker frequencies of the flame and the spurious emission are statistically distributed relative to one another, time differences occur between flame pulses 50 and spurious pulses 51 at points A and B, so that the AND-gate 18 is largely opened for the further transmission of useful pulses 50 to the following integrator 19. This ensures that an alarm is given when a flame and interference are simultaneously present. All the examples of FIG. 7 and the following table can be performed with the embodiment of FIG. 9. The individual electronic circuit components of the two circuits of FIG. 9 have not been described in detail because they are well known from the literature. Reference is made in this regard to the following literature:

"Linear Applications Handbook" Volumes 1 and 2, 1977, National Semiconductor Corporation.

"Applications of Operational Amplifiers", Publishers, McGraw-Hill Company, New York, 1976.

"Sourcebook of Electronic Circuits", Publishers, McGraw-Hill Company, New York, 1968.

U.S. Pat. Nos. 3,762,674, 3,940,353 and 3,940,753.

Figure 10:
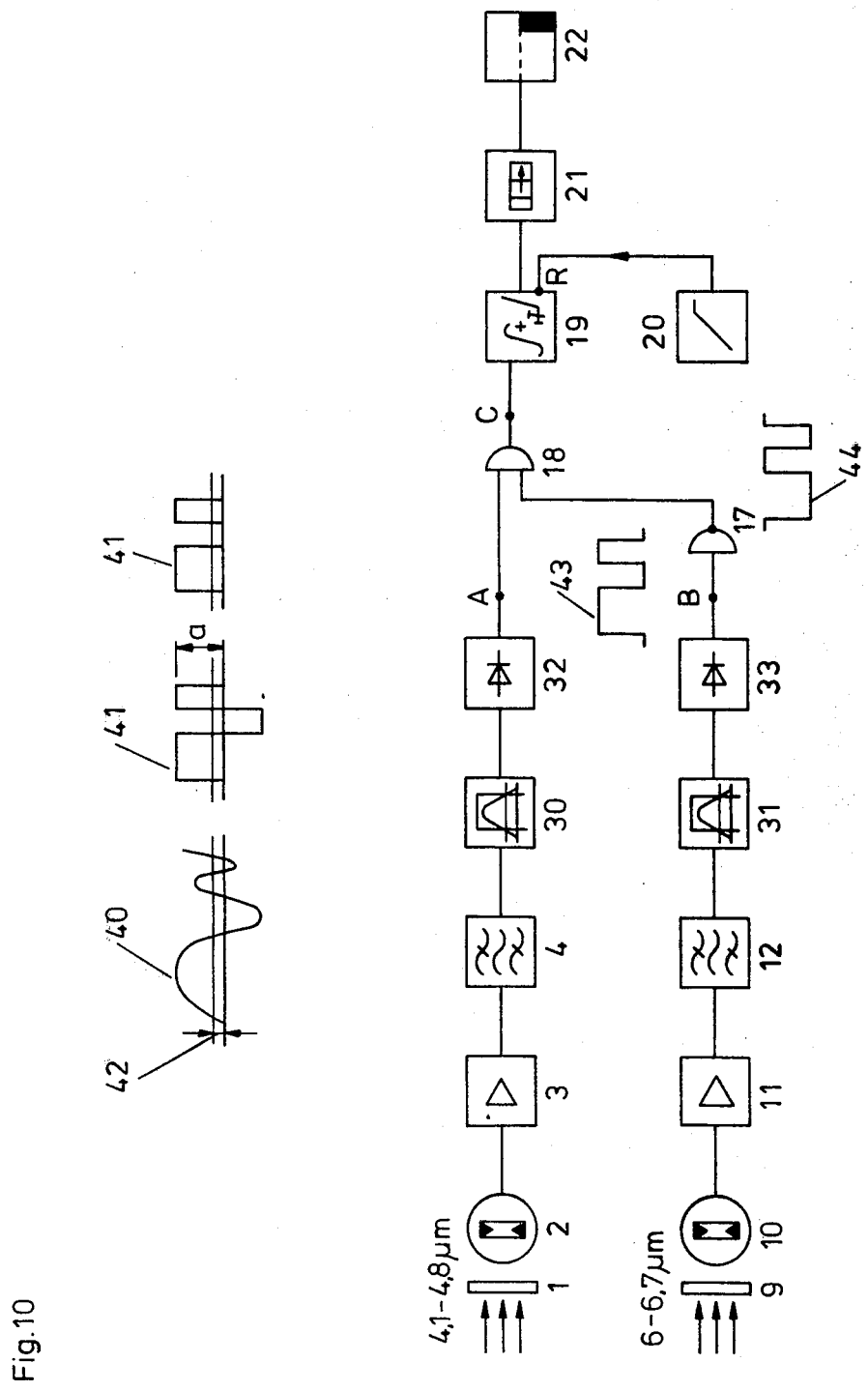
FIG. 10 is a schematic circuit diagram in block form of a second embodiment of a fire alarm circuit according to the invention in partial digital form accompanied by a corresponding graph of the signals therein.

The embodiment of FIG. 10 is constructed substantially like the embodiment of FIG. 9. The only difference is that the pulses appearing at points A and B no longer have a width which is independent of the flame flicker frequency and the spurious emission. In the embodiment of FIG. 10, the pulses 41 have a width which is dependent on the cycles of the oscillations 40. The cycle of said oscillations 40 represents the flame flicker frequency or the spurious emissions. The width or duration of pulses 41 and 43 is determined by the threshold 42 of comparator 30 or 31. The two circuits are equipped with the same electronic components. Filters 1 and 9 have the same transmission ranges as in the embodiment of FIG. 9. The photoelectric means 2 and 10, amplifiers 3 and 11 and band-pass filters 4 and 12 are constructed in the same way as previously described above. Comparators 30 and 31 are arranged behind band-pass filters 4. The output signals from these comparators, shown at the top of FIG. 10, reach rectifiers 32 and 33. The operation of comparators 30 and 31 will now be described. The value of the output signal is:

$a$ if $S_A(t) > \epsilon$ $-a$ if $S_A(t) < \epsilon$

In which:
$S_A$ = amplitude of the input signal at both comparators 30 and 31.
$\epsilon$ = threshold value.

The mathematical expression indicates that the same input signal $S_A$ can be present for the first circuit (comparator 30) and the second circuit (comparator 31), and that the output pulses of both comparators have a constant amplitude $+a$ or $-a$. The threshold $\epsilon$ is provided so that noise in the two circuits can be better suppressed. The function of elements 19, 20, 21, 22 and AND-gate 18 is the same as in the embodiment of FIG. 9. Here again, integrator 19 has a counter with a predetermined threshold value. The counter is reset after a given time of approximately 5 to 15 seconds. If the counter has exceeded its threshold value prior to this resetting, a signal is transmitted to the delay element 21. The counter in the integrator 19 can be replaced by a capacitor which is successively charged by the pulses which are allowed to pass through the AND-gate 18 when pulses 43 are not present at point B of the second circuit. For reasons of completeness, it is pointed out that the inverter 17 supplies the inverted pulses 44 to the second input of the AND-gate 18 and consequently blocks or opens the AND-gate for the further transmission of pulses 41 from the first circuit.

The embodiment of FIG. 11 shows to circuits with similar electronic components to those described hereinbefore. However, in this case demodulators 38 or 39 are arranged behind band-pass filters 4 or 12. Each of these demodulators comprises a rectifier 34 or 36 and a low-pass filter 35 or 37. Comparators 30, 31 and rectifiers 7, 15 are again arranged behind demodulators 38, 39. Through the arrangement of the demodulators 38, 39 the modulation envelope curve 46 of the rectified signal half-waves 45 can be formed from the flicker frequency 40 of the flame and the spurious emission. Demodulators 38, 39 are not described in detail here, because they are generally known from the literature. Reference can be made to the already quoted literature sources.

Comparators 30 and 31 take account of the predetermined threshold value $\epsilon$ in the same way as described in conjunction with FIG. 10. If a flame is present in accordance with FIG. 7, the first circuit produces corresponding envelope curves 46. At point A, pulses 47 occur and their width is dependent on the modulation envelope curve 46 which envelops the oscillations 45 of the flame flicker frequency. The amplitude of pulses 47 is constant. If there is a spurious emission source in accordance with the different cases of FIG. 7, the second circuit also produces modulation envelope curves 46. Modulator 31 takes account of threshold value $\epsilon$. At point B, pulses 48 are produced with a width which is dependent on the modulation envelope curve 46 enveloping the oscillations 45 of the flicker frequency of the spurious emission source. The subsequently arranged inverter 17 produces the inverted pulses 49. AND-gate 18 functions in the same way as described in conjunction with the previous embodiments. Integrator 19 can contain either a counter or a capacitor. The formation of the threshold value and the time-based resetting by the time switch 20 have already been described several times.

Figure 12:
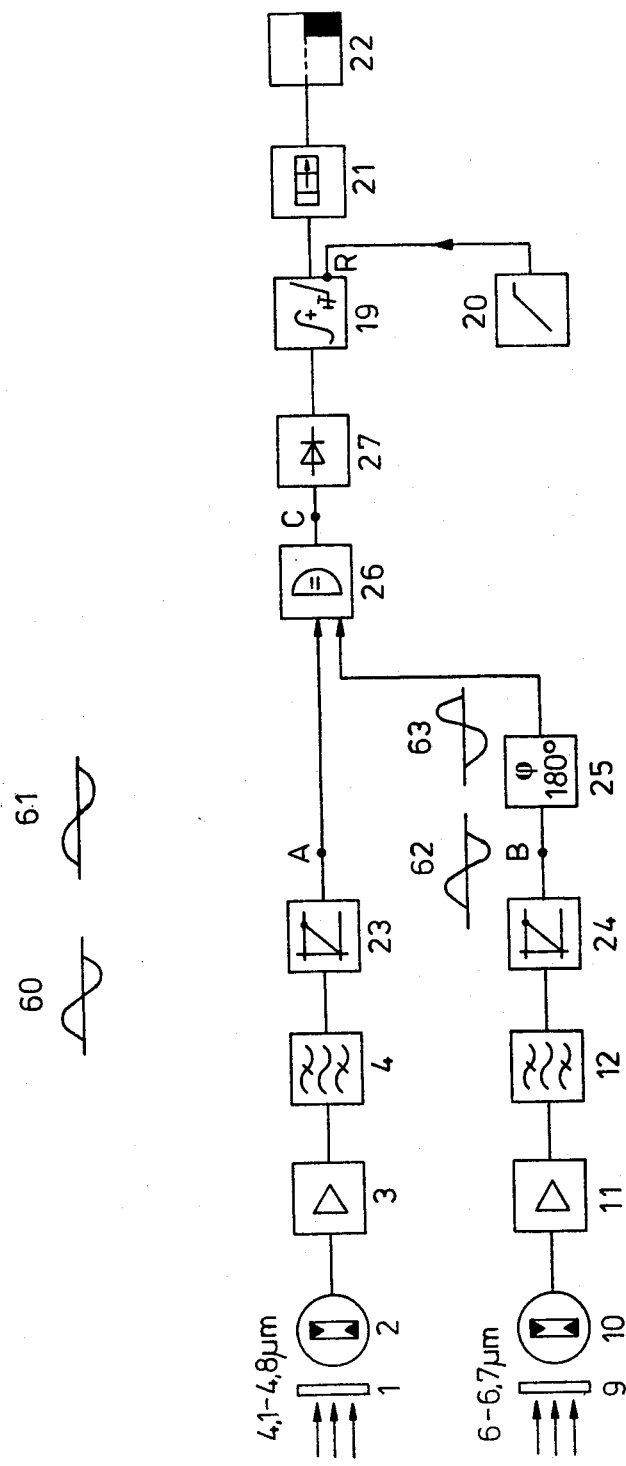
FIG. 12 is a schematic circuit diagram in block form of a fourth embodiment of a fire alarm circuit in accordance with the invention which is in part identical to that of FIG. 11, accompanied by a corresponding graph of the signals therein.

The fourth embodiment of FIG. 12 once again comprises the two circuits and a connecting means 26, which in this case is constructed as a phase comparator. Filters 1 and 9 have the same transmission range as in the earlier embodiments. Once again photoelectric means 2 and 10 are equivalently constructed. Amplifiers 3 and 11 amplify the signals. Filters 4 and 12 permit the passage of the flicker frequency only in the range 4 to 15 Hz. These oscillations in the flicker frequency range of the flame and the spurious emission are indicated at the top of FIG. 12 by the reference numeral 60. These oscillations reach the threshold value detectors 23 and 24. If there is a flame, an oscillation 61 is present at point A of the first circuit. If a spurious emission source is present, an oscillation 62 occurs at point B of the second circuit. In the following phase inverter 25, the oscillation 62 is converted into an oscillation 63. The oscillation signal 61 of point A now passes through phase comparator 26 to rectifier 27 and integrator 19 if the signal 63 is unidirectional with respect to signal 61. In other words, signal 62 must not be unidirectional with respect to signal 61. The terms "unidirectional" or "not unidirectional" should be understood to mean that in the first case equal signs, and in the second case unequal signs, are present at the two inputs of phase comparator 26. The operation leading to the alarm via integrator 19 and delay element 21 is the same as described hereinbefore.

It is finally pointed out that the embodiments of FIGS. 9, 10, 11 and 12 can have numerous circuits of the first type for useful signals of the flame emission and only one circuit of the second type for the spurious signals of the interference source. This means that each of the useful signal circuits functions in a different wavelength range, e.g. chosen from the ranges of 4 to 4.8 $\mu$m, 3 to 3.8 $\mu$m, 1.8 to 2.8 $\mu$m, 0.7 to 1.2 $\mu$m, and 0.1 to 0.5 $\mu$m, while the spurious signal circuit functions in the wavelength range above 6 $\mu$m, as is represented e.g. in FIG. 5.

FIG. 13 shows a further embodiment of the interconnecting member for the useful signal and spurious signal circuits, the connecting means being in the form of a NOR-gate. This is a NOR-gate 59, whose one input contains an inverter 58. The operation of the connecting means 58, 59 is the same as that of means 17, 18 of the embodiments of FIGS. 9, 10 and 11, so that no further description will be provided here.

While there are shown and described present preferred embodiments of the invention, it is to be distinctly understood that the invention is not limited thereto, but may be otherwise variously embodied and practiced within the scope of the following claims. Accordingly,

What I claim is:

1. A radiation detector for a flame alarm comprising:
a sensor element;
a filter arranged forwardly of said sensor element; and said filter comprising a quartz filter element and a germanium filter element.

2. The radiation detector as defined in claim 1, further including:
a spectral band filter for wavelengths of about 4.0-4.8 μm cooperating with said quartz filter element and germanium filter element.

3. The radiation detector as defined in claim 1, further including:
a narrow band-filter element for a wavelength of about 4.3-4.4 μm cooperating with said quartz filter element and said germanium filter element.

4. The radiation detector as defined in claim 3, wherein:
said narrow band-filter element is structured from interference filter layers.

5. The radiation detector as defined in claim 1, wherein:
said sensor element comprises a pyroelectrical sensor.

6. The radiation detector as defined in claim 5, wherein:
said sensor element essentially consists of lithium-tantalate.

7. The radiation detector as defined in claim 5, wherein:
said sensor element essentially consists of lead-zirconate-titanate.

8. The radiation detector as defined in claim 1, wherein:
said quartz filter element essentially fails to pass radiation above 4.5 μm wavelength.

9. The radiation detector as defined in claim 1, wherein:
said germanium filter element is essentially impassible for wavelengths below approximately 1.5 μm.

10. The radiation detector as defined in claim 1, wherein:
said germanium filter element is practically impassible for visible light.

* * * * *